(12) United States Patent
Zhang et al.

(10) Patent No.: US 12,204,489 B2
(45) Date of Patent: Jan. 21, 2025

(54) PARTITIONING DATAFLOW OPERATIONS FOR A RECONFIGURABLE COMPUTING SYSTEM THROUGH RECURSIVE CANDIDATE GENERATION

(71) Applicant: SambaNova Systems, Inc., Palo Alto, CA (US)

(72) Inventors: Yaqi Zhang, Foster City, CA (US); Mark Wagner, Palo Alto, CA (US); Matthew Feldman, Oakland, CA (US); Weiwei Chen, Mountain View, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 54 days.

(21) Appl. No.: 17/894,127

(22) Filed: Aug. 23, 2022

(65) Prior Publication Data

US 2023/0281156 A1 Sep. 7, 2023

Related U.S. Application Data

(60) Provisional application No. 63/317,476, filed on Mar. 7, 2022.

(51) Int. Cl.
*G06F 15/78* (2006.01)
*G06F 9/50* (2006.01)

(52) U.S. Cl.
CPC ........ *G06F 15/7875* (2013.01); *G06F 9/5044* (2013.01)

(58) Field of Classification Search
CPC ......... G06F 2209/503; G06F 2209/506; G06F 2209/5038; G06F 2209/5044;
(Continued)

(56) References Cited

U.S. PATENT DOCUMENTS 11,467,827 B1 * 10/2022 Zuckerman ............. G06F 9/544
2008/0022278 A1 * 1/2008 Gschwind ............. G06F 9/5027
718/100

(Continued)

*Primary Examiner* — Raymond N Phan
(74) *Attorney, Agent, or Firm* — Flagship Patents; Sikander M. Khan; Bruce A. Young

(57) ABSTRACT

A method for partitioning executable operations for a reconfigurable computing system includes receiving a set of expressions comprising a plurality of operations and dependencies for those operations, partitioning the plurality of operations into selected executable partitions wherein each selected executable partition conforms to resource constraints for a reconfigurable unit of the reconfigurable computing system. Partitioning the plurality of operations into selected executable partitions may include seeding a candidate partition with an operation, recursively generating an additional candidate partition for each operation adjacent to the candidate partition whose dependent operations are already within the candidate partition or a previously selected partition, and selecting a best candidate partition based on resource cost. A corresponding system and computer-readable medium are also disclosed herein. The system includes a partitioning module that that partitions the plurality of operations into selected executable partitions according to the method describe above.

36 Claims, 14 Drawing Sheets

(58) Field of Classification Search
CPC ............ G06F 15/7871; G06F 15/7878; G06F 15/7882; G06F 15/7885; G06F 15/7892; G06F 3/0604; G06F 3/0683; G06F 3/0644; G06F 9/5077
See application file for complete search history.

(56) References Cited

U.S. PATENT DOCUMENTS

2010/0079302 A1* 4/2010 Eide .................. G06F 9/5077
340/691.8
2010/0250892 A1* 9/2010 Logan ................ G06F 9/45558
711/E12.002

\* cited by examiner

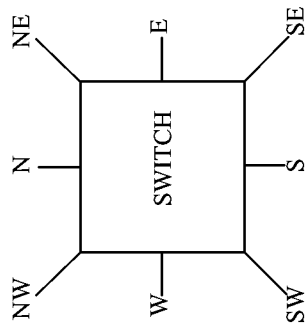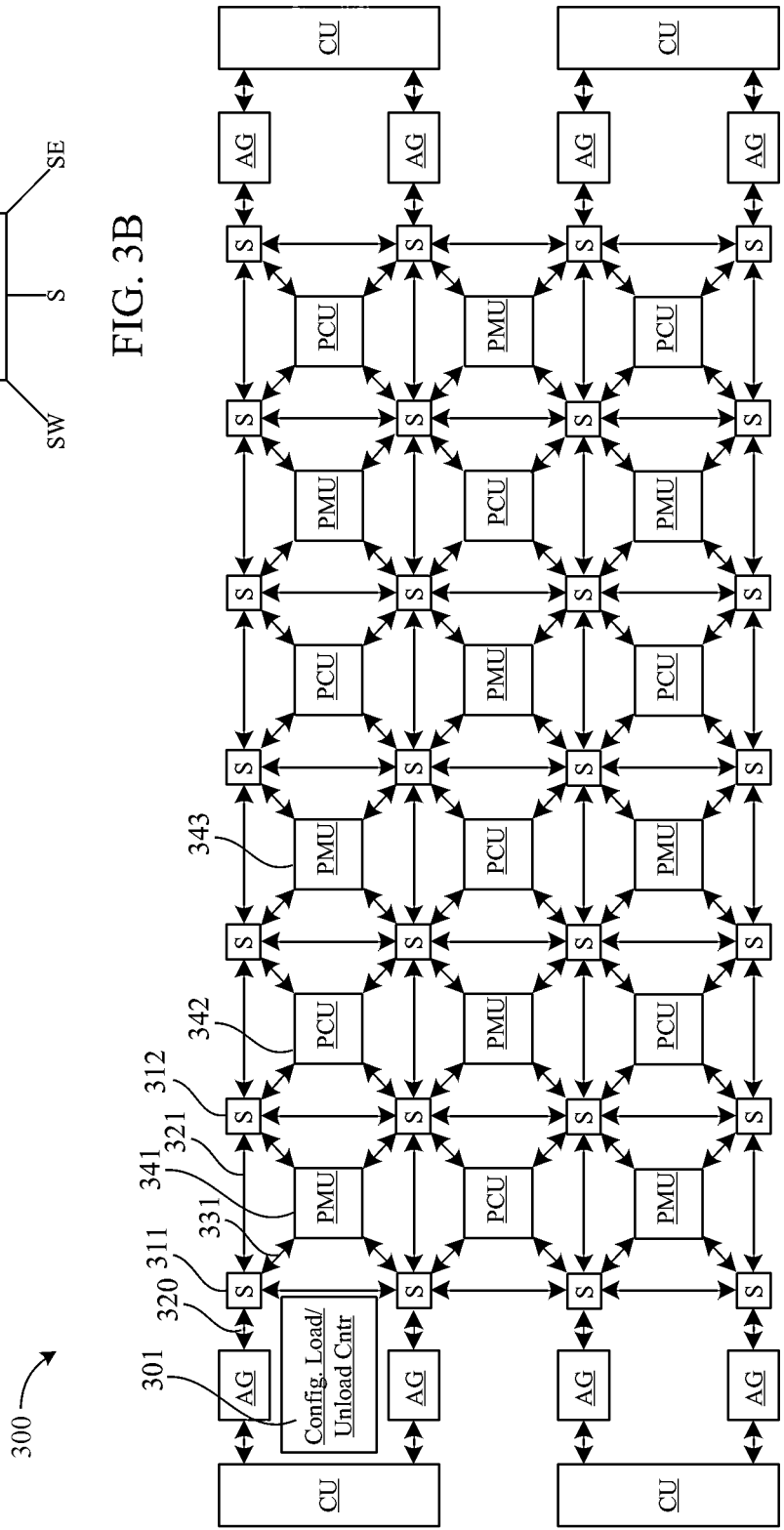
FIG. 3B
FIG. 3A

```
# entry function
# graph: dataflow graph
def partition_graph(graph: set, threshold: cost):
    #set of graphs to be partitioned
    worklist = {}
    # successful partitions that fit in physical units
    partitions = {}
    # add the graph to worklist
    add_to_worklist(worklist, graph)

while !worklist.empty():
        graph = worklist.pop()
        cost = eval_cost(graph)
        if !fit(graph, threshold):
            partition = root_nodes(graph, partitions)
            visited = {}
            best_part = partition
            best_cost = inifite_cost
            expand_partition(partition, visited, resourcesAvailable[], best_cost, best_part)
            if fit(best_part, threshold):
                partitions.add(part)
                remaining_nodes = graph - partition
                add_to_worklist(worklist, remaining_nodes)
            else:
                return failure
        else:
            partitions.add(part)
    return partitions def root_nodes(graph, partitions):
    # return the set of nodes inside graph that doesn't have any dependents
    # that is not already belonging to a partition
    # i.e. the returned node either has no out going edge, or the out going edge
    # goes into a node that already belongs to a partition
```

FIG. 9A

```
# remaining_nodes are set of nodes that have not been placed in a selected partition
def add_to_worklist(worklist, remaining_nodes):
   # add all remaining nodes and the node(s) the remaining nodes depend on
   # into the worklist.  Adding the dependent nodes of the remaining nodes into the
   # worklist, might result in a final set of partitions where one node is assigned to
   # multiple partitions.  In fact, by duplicating the computation (nodes) in a different
   # partition, it's possible to end up with fewer partitions partition is a set of nodes
visited is a set of partitions we've tried so far
# threshold: HW threshold. (number of stages, PRs, # IO ports, etc)
# best_part: set of nodes. partition with lowest cost we've seen so far
def expand_partition(partition:set , visited: set,
      threshold:Cost, best_cost:Cost, best_part: set):
   frontier = create_frontier(partition)

# visited ensures that we try all combination of nodes rather than permutation of
   # nodes i.e. a partition of [a, b, c] is the same as [a, c, b] so we don't continue
   # recursion on [a, c, b]
   if (visited.contains(partition))
      return visited.add(partition)

for node in frontier:
      partition.add(node)
      cost = eval_cost(partition)
      best_cost, best_part = update_best(cost, part, best_cost, best_part);
      skip = should_skip(partition, cost, threshold, best_part, visited)

if (!skip)
         expand_partition(partition, threshold, visited, best_cost, best_part)

partition.remove(node)

def update_best(cost, part, curr_best_cost):
   if (cost < curr_best_cost)
      return cost, part;
   return best_cost, best_part
```

FIG. 9B

*Leaf Node

PARTITIONING DATAFLOW OPERATIONS FOR A RECONFIGURABLE COMPUTING SYSTEM THROUGH RECURSIVE CANDIDATE GENERATION

RELATED APPLICATIONS AND DOCUMENTS

This application claims the benefit of (priority to) U.S. Provisional Patent Application No. 63/317,476, filed Mar. 7, 2022, entitled "PARTITIONING DATAFLOW OPERATIONS FOR A RECONFIGURABLE COMPUTING SYSTEM"; This application is also related to the following papers and commonly owned applications:

Zhang et al., "SARA: Scaling a Reconfigurable Dataflow Accelerator," 2021 ACM/IEEE 48th Annual International Symposium on Computer Architecture (ISCA), 2021, pp. 1041-1054;

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;

U.S. Nonprovisional patent application Ser. No. 16/536,192, filed Aug. 8, 2019, entitled "COMPILER FLOW LOGIC FOR RECONFIGURABLE ARCHITECTURES";

U.S. Nonprovisional patent application Ser. No. 17/326,128, filed May 20, 2021, entitled "COMPILER FLOW LOGIC FOR RECONFIGURABLE ARCHITECTURES";

U.S. Nonprovisional patent application Ser. No. 16/572,516, filed Sep. 16, 2019, entitled "EFFICIENT EXECUTION OF OPERATION UNIT GRAPHS ON RECONFIGURABLE ARCHITECTURES BASED ON USER SPECIFICATION";

U.S. Nonprovisional patent application Ser. No. 17/214,768, filed Mar. 26, 2021, entitled "RESOURCE ALLOCATION FOR RECONFIGURABLE PROCESSORS";

All of the related application(s) and documents listed above are hereby incorporated by reference herein for all purposes.

BACKGROUND

The present subject matter relates to partitioning dataflow operations for reconfigurable coarse-grained computing systems.

Reconfigurable processors can be configured to implement a variety of functions more efficiently or faster than might be achieved using a general-purpose processor executing a computer program. So called coarse-grained reconfigurable architectures (e.g. CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

Partitioning dataflow operations and assigning the partitioned operations to available processing resources presents a challenge for reconfigurable coarse-grained computing systems.

SUMMARY OF THE INVENTION

A method for partitioning executable operations for a reconfigurable computing system includes receiving a set of expressions comprising a plurality of operations and dependencies for those operations, partitioning the plurality of operations into selected executable partitions wherein each selected executable partition conforms to resource constraints for a reconfigurable unit of the reconfigurable computing system. Partitioning the plurality of operations into selected executable partitions may include seeding a candidate partition with an operation, recursively generating an additional candidate partition for each operation adjacent to the candidate partition whose dependent operations are already within the candidate partition or a previously selected partition, and selecting a best candidate partition based on resource cost.

A corresponding system and computer-readable medium are also disclosed herein. The system includes a parsing module that receives a set of expressions for a reconfigurable computing system and parses the set of expressions into a plurality of operations and dependencies for those operations. The system also includes a partitioning module that partitions the plurality of operations into selected executable partitions according to the method described above.

BRIEF DESCRIPTION OF THE DRAWINGS

FIG. 3A is a simplified diagram of a tile and an array level network usable in the configuration of FIG. 2, where the configurable units are nodes on the array level network.

FIG. 3B illustrates an example switch unit connecting elements in an array level network.

FIGS. 9A and 9B show one example of pseudo-code for implementing the method of FIG. 8.

DETAILED DESCRIPTION

The following detailed description is made with reference to the figures. Example implementations are described to illustrate the technology disclosed, not to limit its scope, which is defined by the claims. Those of ordinary skill in the art will recognize a variety of equivalent variations on the description that follows.

FIGS. 1A-1C and FIGS. 2-5 show one example of an environment wherein the present invention may be deployed and provide information on compute units, memory units and address generators.

Figure 1A:
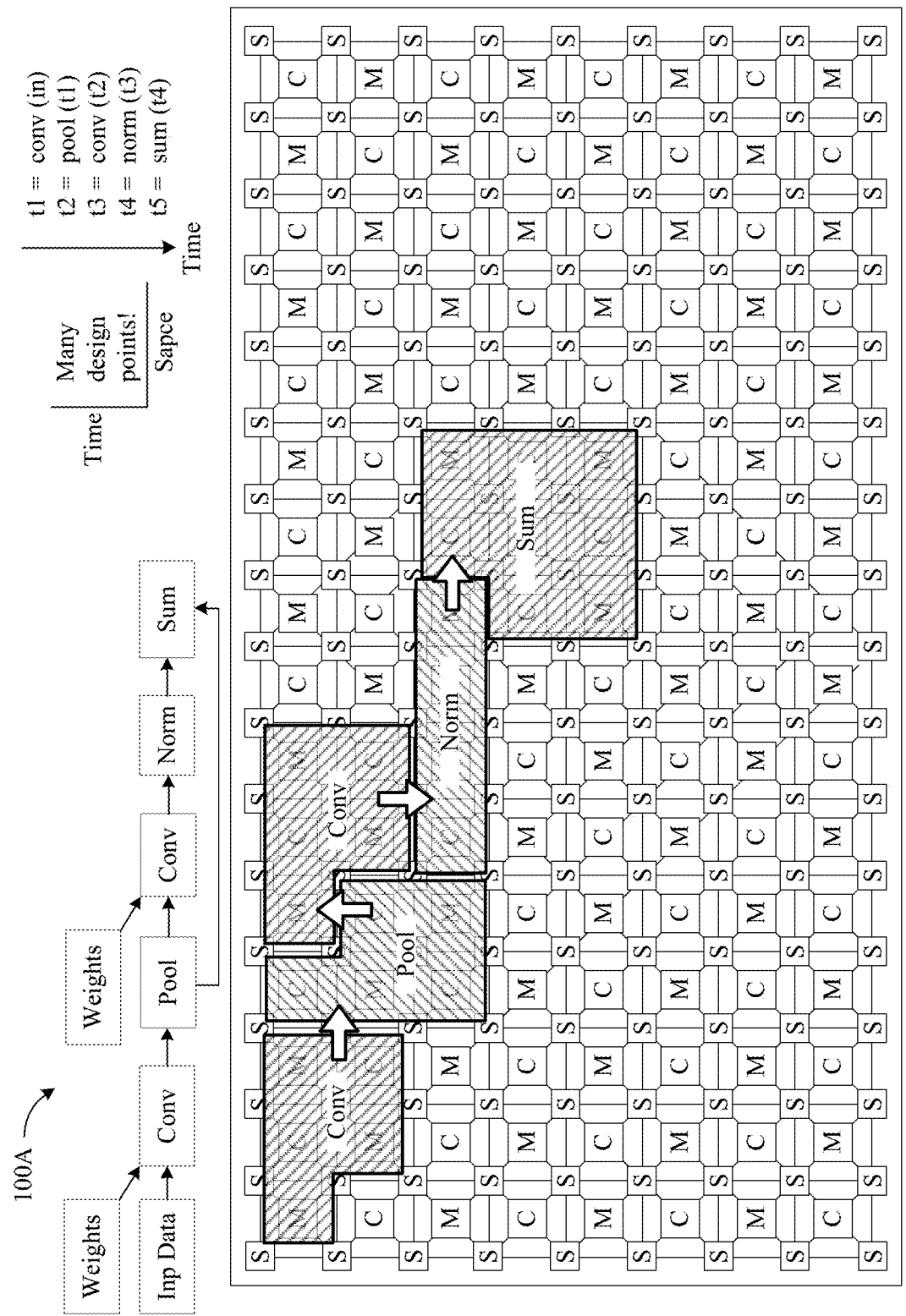
FIG. 1A is a layout diagram illustrating a CGRA (Coarse-Grained Reconfigurable Architecture) suitable for dataflow computing.
Figure 1B:
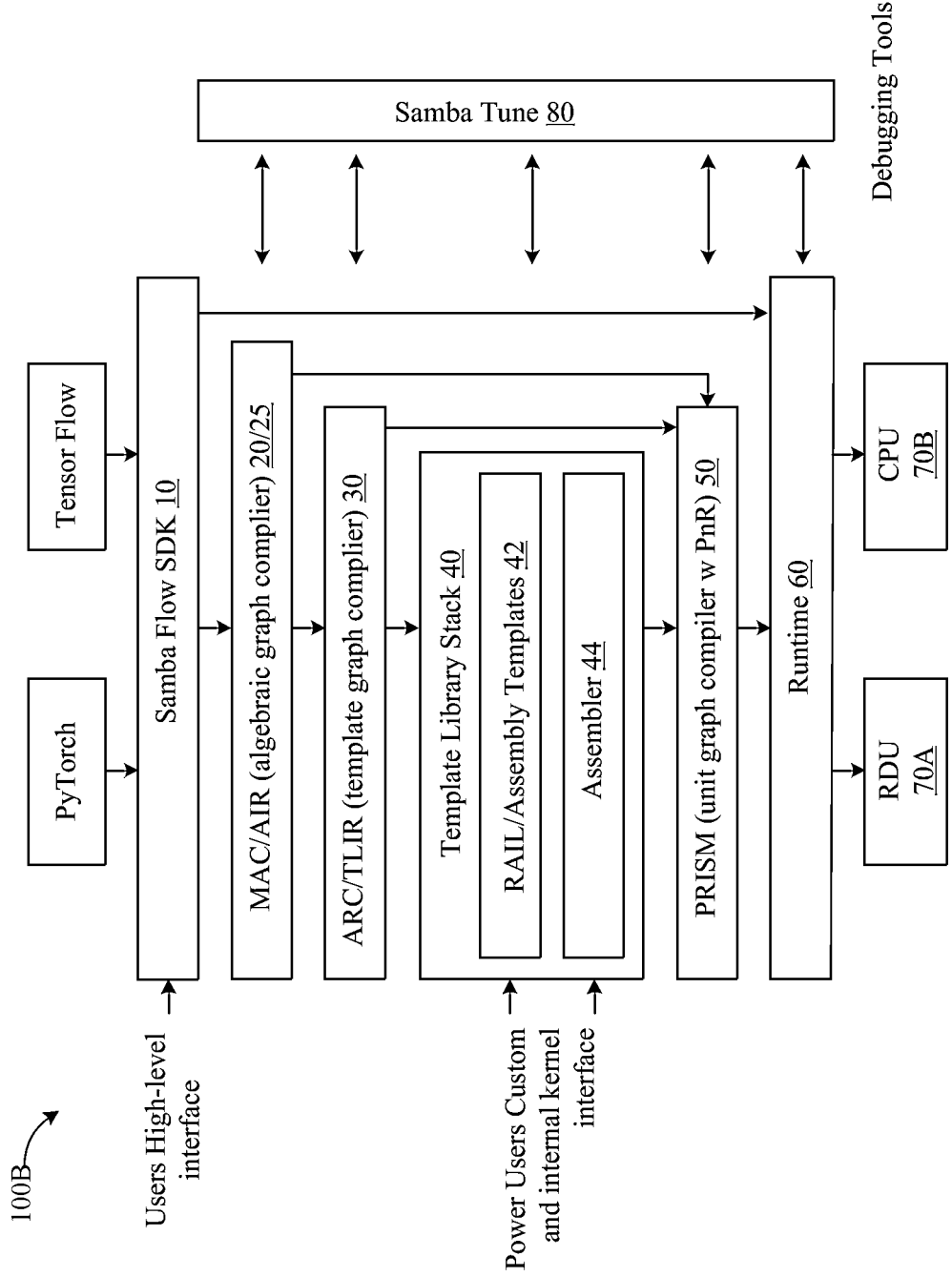
FIG. 1B is a block diagram of a compiler stack suitable for a CGRA (Coarse-Grained Reconfigurable Architecture).

Referring now to FIGS. 1A and 1B, FIG. 1A is a layout diagram illustrating a CGRA (Coarse Grain Reconfigurable Architecture) 100A suitable for dataflow computing. The depicted CGRA comprises compute units and memory units interleaved into a computing grid. The compute units and memory units as well as address generation units (not shown in FIG. 1) may be reconfigurable units that support dataflow computing. One or more instances of the depicted CGRA computing grid along with some external communication ports (not shown) may be integrated into a computational unit referred to as an RDU (Reconfigurable Dataflow Unit).

The architecture, configurability and dataflow capabilities of the CGRA enables increased computing power that supports both parallel and pipelined computation. Consequently, the CGRA represents a computing paradigm shift that provides unprecedented processing power and flexibility. Leveraging the parallel, pipelined and reconfigurable aspects of the CGRA adds new dimensions of complexity that requires a fundamentally new instruction compilation process and software stack.

While traditional compilers sequentially map operations to processor instructions, typically without regard to pipeline utilization and duration (a task usually handled by the hardware), the course-grained reconfigurable computing grid requires mapping operations to processor instructions in both time and space. Furthermore, while communication through the memory hierarchy of traditional (e.g., von Neumann) computers is implicitly sequential and handled by hardware, dataflow compilers map both sequential (including pipelined) operations and parallel operations to instructions in time and in space and may also program the communication between the compute units and memory units.

The depicted example, which illustrates typical machine learning operations on images, includes two stages of convolution operations that are augmented with a pooling stage, a normalization stage, and a summing stage. One of skill in the art will appreciate that the depicted stages may be used as a highly efficient pipeline if the throughputs of the stages are appropriately matched. One of skill in the art will also appreciate that other operations and tasks may be executing in parallel to the depicted operations and that the allocation of resources must be spatially and temporally coordinated. Consequently, compiler (and optionally programmer) assignment of compute and memory resources to the various stages of processing (both spatially and temporally) has a direct effect on resource utilization and system performance.

FIG. 1B is a block diagram of a compiler stack 100B suitable for a CGRA (Coarse Grain Reconfigurable Architecture). As depicted, the compiler stack 100B includes a number of stages or levels that convert high-level algorithmic expressions and functions (e.g., PyTorch and TensorFlow expressions and functions) to configuration instructions for the reconfigurable units of the CGRA.

The SambaFlow SDK 10 converts user selected and configured algorithms and functions from high-level libraries such as PyTorch and TensorFlow to computational graphs. The nodes of the computational graphs are intrinsically parallel unless a dependency is indicated by an edge in the graph.

The MAC (Model Analyzer and Compiler) level 20 makes high-level mapping decisions for (sub-graphs of the) computational graphs based on hardware constraints. The depicted embodiment supports various application frontends such as Samba, JAX, and TensorFlow/HLO. The MAC may also transform the graphs via autodiff and GradNorm, perform stitching between sub-graphs, interface with template generators for performance/latency estimation, convert Samba operations to AIR (Arithmetic/Algebraic Intermediate Representation) operations, perform tiling, sharding and section cuts and model/estimate the parallelism that can be achieved on the computational graphs.

The AIR level 25 translates high-level graph and mapping decisions provided by the MAC level into explicit TLIR (Template Library Intermediate Representation) graphs. The key responsibilities of the AIR level 25 include legalizing the graph and mapping decisions of the MAC, expanding data parallel, tiling, metapipe, region, and hypersection instructions provided by the MAC, converting AIR operations to TLIR operations, inserting stage buffers and skip buffers, eliminating redundant operations, buffers and sections and optimizing for resource use, latency, and throughput.

The ARC level 30 translates mid-level (e.g., TLIR) graphs provided by AIR into Prism source code optimizing for the target hardware architecture and legalizes the dataflow graph through each performed step. The translating is accomplished by converting IR (intermediate representation) operations to appropriate Prism/RAIL (RDU Abstract Intermediate Language) templates, stitching templates together with data-flow and control-flow, inserting necessary buffers and layout transforms, generating test data and optimizing for resource use, latency, and throughput.

The template library stack (or RAIL layer) 40 provides a library of templates 42 and functions to leverage those templates. The templates 42 are containers for common operations. Templates may be implemented using Assembly or RAIL. While RAIL is similar to Assembly in that memory units and compute units are separately programmed, RAIL provides a higher level of abstraction and compiler intelligence via a concise performance-oriented DSL (Domain Specific Language) for RDU templates. RAIL enables template writers and external power users to control the interactions between the logical compute units and memory units with high-level expressions without the need to manually program capacity splitting, register allocation, etc.. The logical compute units and memory units also enable stage/register allocation, context splitting, transpose slotting, resource virtualization and mapping to multiple physical compute units and memory units (e.g., PCUs and PMUs). RAIL also enables event handle allocation.

The Assembler level 44 provides an architecture agnostic low-level programming model as well as optimization and code generation for the target hardware architecture. Responsibilities of the Assembler include address expression compilation, intra-unit resource allocation and management, legalization with target-specific rules, low-level architecture-specific transformations and optimizations, and architecture-specific code generation.

The Prism layer 50 translates ARC template graphs to a physical chip mapping, generates code for the target hardware architecture, legalizes and lowers dataflow graphs to the physical network (e.g., PCUs, PMUs and switches) and produces PEF (Processor Executable Format) files. The Prism layer 50 also conducts PNR (Place and Route) by generating bandwidth calculations, determining the placement of PMUs and PCUs, allocating AGCUs (address generation control units) and VAGs (Virtual Address Generators), selecting PCM/PCU ports and generating configuration information for compute grid switches to enable data routing.

The runtime layer 60 controls execution of the physical level dataflow graphs on actual hardware such the RDU 70A and/or CPU 70B. SambaTune 80 is a set of debugging tools that can facilitate users to perform deadlock and performance debugging RDUs. SambaTune 80 can summarize and visualize instrumentation counters from the RDU that can guide users to identify performance bottlenecks and eliminate by tuning various control parameters.

Array Level Network (ALN)—a Flexible Network for Dataflow Processing

Referring now to FIG. 1C through FIG. 5 generally, a tile of an embodiment of a coarse-grain reconfigurable architecture (CGRA) is based on an array of fused compute-memory units (FCMUs), pattern memory units (PMUs), and/or pattern compute units (PCUs) arranged in two dimensions, M×N. Unless clearly noted from context, any reference to a FCMU, PCU, or PMU may refer to one or more of the other units. The communication between a set of FCMUs is performed over a (M+1)×(N+1) switch fabric called the array-level network (ALN) where each switch has connections to its neighboring FCMUs and to neighboring switches in each of the four directions.

The ALN includes three physical networks—Vector, Scalar and Control. The vector network and scalar networks are packet switched whereas the control network is circuit switched. Each vector packet consists of a vector payload and a header that includes information such as the packet's destination, sequence ID, virtual channel (aka flow control class) etc. Each scalar packet contains a word (32-bits) of payload and a header containing the packet's destination and the packet's type. The Control network consists of a set of single bit wires where each wire is pulsed to transmit a specific control token providing distributed control to orchestrate the execution of a program across multiple FMCUs. The scalar network can also be used to carry control information by overloading a scalar packet using its packet type field.

Parallel Applications such as Machine Learning, Analytics, and Scientific Computing require different types of communication between the parallel compute units and the distributed or shared memory entities. These types of communication can be broadly classified as point-to-point, one-to-many, many-to-one and many-to-many. The ALN enables these communication types through a combination of routing, packet sequence ID and flow control.

Routing of packets on the vector and scalar networks is done using two mechanisms—2D Dimension Order Routing (DOR) or using a software override using Flows. Flows can be used for multiple purposes such as to perform overlap-free routing of certain communications and to perform a multicast from one source to multiple destinations without having to resend the same packet, once for each destination.

Sequence ID based transmissions allow the destination of a many-to-one communication to reconstruct the dataflow order without having to impose restrictions on the producer/s. The packet switched network provides two flow control classes—end to end flow controlled and locally flow controlled. The former class of packet, VC_B, is released by a producer only after ascertaining that the consumer has space for it. The latter class of packet, VC_A, is loosely flow controlled and released into the network without knowing if the receiver has space for it. VC_A packets are used for performance critical communication where a non-overlapping route can be provided between the producer and consumer.

The core component of the ALN is the ALN switch. A packet or control pulse enters the ALN through an interface between the producing FCMU(X) and one of its adjacent switches. While in the ALN, the packet/pulse takes some number of hops until it reaches a switch adjacent to the consumer FCMU (Y). Finally, it takes the interface to Y to complete the route.

When a packet reaches a switch's input port, it is first inspected to see if it should be dimension order routed or flow routed. If it is the former, the destination ID is mapped to a unique output port. If it is the latter, the flow ID of the incoming packet is used to index into a table that identifies the output ports to route the packet to.

Packets from the two different flow control classes, VC_A and VC_B, are managed differently at the source port of every switch. Since VC_B packets are end-to-end flow controlled, they are always allowed to make forward progress through it regardless of the blocking conditions on VC_A packets.

Figure 1C:
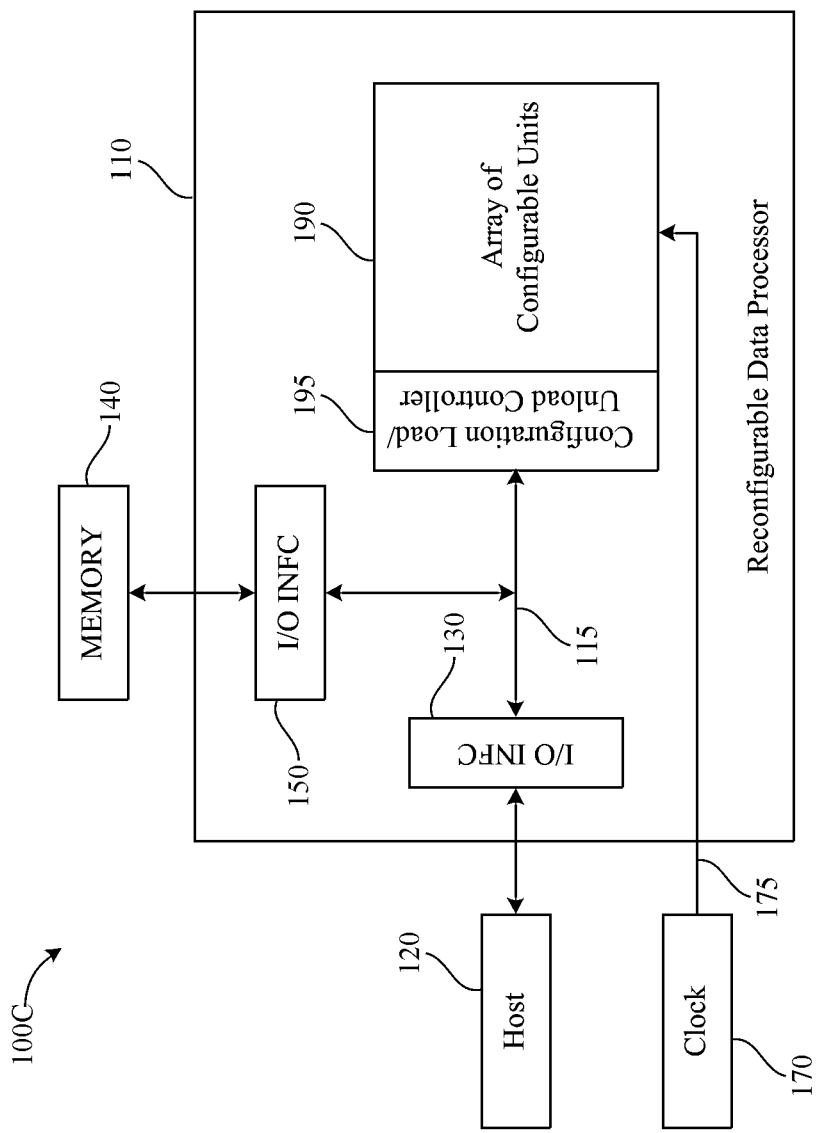
FIG. 1C is a system diagram illustrating a system including a host, a memory, and a reconfigurable data processor.

FIG. 1C is a system diagram illustrating a system 100C including a host 120, a memory 140, and a reconfigurable data processor 110. As shown in the example of FIG. 1C, the reconfigurable data processor 110 includes an array 190 of configurable units and a configuration load/unload controller 195. The phrase "configuration load/unload controller", as used herein, refers to a combination of a configuration load controller and a configuration unload controller. The configuration load controller and the configuration unload controller may be implemented using separate logic and data path resources or may be implemented using shared logic and data path resources as suits a particular embodiment. In some embodiments, a system may include only a configuration load controller of the types described herein. In some embodiments, a system may include only a configuration unload controller of the types described herein.

The reconfigurable processor 110 includes an external I/O interface 130 connected to the host 120, and external I/O interface 150 connected to the memory 140. The external I/O interfaces 130, 150 connect via a bus system 115 to the array 190 of configurable units and to the configuration load/unload controller 195. The bus system 115 may have a bus width that carries one chunk of data, which can be for this example 128 bits (references to 128 bits throughout can be considered as an example chunk size more generally). In general, a chunk of the configuration file can have N bits of data, and the bus system can be configured to transfer N bits of data in one bus cycle, where N is any practical bus width. A sub-file distributed in the distribution sequence can consist of one chunk, or other amounts of data as suits a particular embodiment. Procedures are described herein using sub-files consisting of one chunk of data each. Of course, the technology can be configured to distribute sub-files of different sizes, including sub-files that may consist of two chunks distributed in two bus cycles for example.

To configure configurable units in the array 190 of configurable units with a configuration file, the host 120 can send the configuration file to the memory 140 via the interface 130, the bus system 115, and the interface 150 in the reconfigurable data processor 110. The configuration file can be loaded in many ways, as suits a particular architecture, including in data paths outside the reconfigurable processor 110. The configuration file can be retrieved from the memory 140 via the memory interface 150. Chunks of the configuration file can then be sent in a distribution sequence as described herein to configurable units in the array 190 of configurable units in the reconfigurable data processor 110.

An external clock generator 170 or other clock signal sources can provide a clock signal 175 or clock signals to elements in the reconfigurable data processor 110, including the array 190 of configurable units, and the bus system 115, and the external I/O interfaces 130 and 150.

Figure 2:
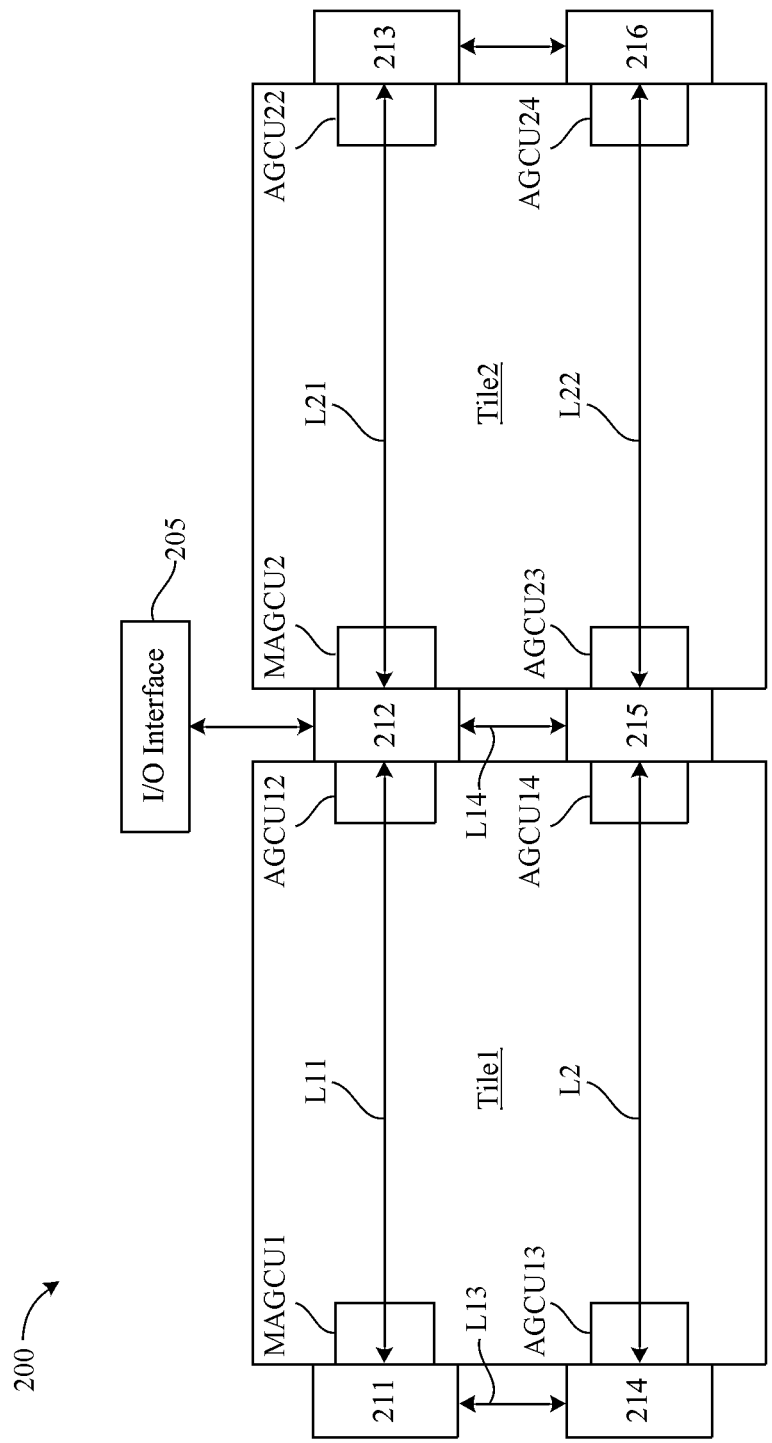
FIG. 2 is a simplified block diagram of a top-level network and components of a CGRA (Coarse Grain Reconfigurable Architecture).

FIG. 2 is a simplified block diagram of components of a CGRA (Coarse Grain Reconfigurable Architecture) processor 200. In this example, the CGRA processor 200 has 2 tiles (Tile1, Tile2). Each tile comprises an array of configurable units connected to a bus system, including an array level network (ALN) in this example. The bus system includes a top-level network connecting the tiles to external I/O interface 205 (or any number of interfaces). In other embodiments, different bus system configurations may be utilized. The configurable units in each tile are nodes on the ALN in this embodiment.

In the depicted embodiment, each of the two tiles has 4 AGCUs (Address Generation and Coalescing Units) (e.g. MAGCU1, AGCU12, AGCU13, AGCU14). The AGCUs are nodes on the top-level network and nodes on the ALNs and include resources for routing data among nodes on the top-level network and nodes on the ALN in each tile.

Nodes on the top-level network in this example include one or more external I/O, including interface 205. The interfaces to external devices include resources for routing data among nodes on the top-level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other embodiments, more than one array configuration load/unload controller can be implemented, and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configurations for more than one tile. In other embodiments, more than one configuration controller can be designed for configuration of a single tile. Also, the configuration load/unload controller can be implemented in other portions of the system, including as a stand-alone node on the top-level network and the ALN or networks.

The top-level network is constructed using top-level switches (211-216) connecting to each other as well as to other nodes on the top-level network, including the AGCUs, and I/O interface 205. The top-level network includes links (e.g. L11, L12, L21, L22) connecting the top-level switches. Data travel in packets between the top-level switches on the links, and from the switches to the nodes on the network connected to the switches. For example, top-level switches 211 and 212 are connected by a link L11, top-level switches 214 and 215 are connected by a link L12, top-level switches 211 and 214 are connected by a link L13, and top-level switches 212 and 213 are connected by a link L21. The links can include one or more buses and supporting control lines, including for example a chunk-wide bus (vector bus). For example, the top-level network can include data, request, and response channels operable in coordination for transfer of data in a manner analogous to an AXI compatible protocol. See, AMBA® AXI and ACE Protocol Specification, ARM, 2017.

Top-level switches can be connected to AGCUs. For example, top-level switches 211, 212, 214 and 215 are connected to MAGCU1, AGCU12, AGC U13 and AGCU14 in the tile Tile1, respectively. Top-level switches 212, 213, 215 and 216 are connected to MAGCU2, AGCU22, AGCU23 and AGCU24 in the tile Tile2, respectively. Top-level switches can be connected one or more external I/O interfaces (e.g. interface 205).

FIG. 3A is a simplified diagram of a tile and an ALN usable in the configuration of FIG. 2, where the configurable units in the array are nodes on the ALN. In this example, the array of configurable units 300 includes a plurality of types of configurable units. The types of configurable units in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns", ISCA '17, Jun. 24-28, 2017, Toronto, ON, Canada, which is incorporated by reference as if fully set forth herein. Each of these configurable units contains a configuration store comprising a set of registers or flip-flops that represent either the setup or the sequence to run a program, and can include the number of nested loops, the limits of each loop iterator, the instructions to be executed for each stage, the source of the operands, and the network parameters for the input and output interfaces.

Additionally, each of these configurable units contains a configuration store comprising a set of registers or flip-flops that store status usable to track progress in nested loops or otherwise. A configuration file contains a bit-stream representing the initial configuration, or starting state, of each of the components that execute the program. This bit-stream is referred to as a bit-file. Program load is the process of setting up the configuration stores in the array of configurable units based on the contents of the bit file to allow all the components to execute a program (i.e., a machine). Program Load may also require the load of all PMU memories.

The ALN includes links interconnecting configurable units in the array. The links in the ALN include one or more and, in this case three, kinds of physical buses: a chunk-level vector bus (e.g. 128 bits of data), a word-level scalar bus (e.g. 32 bits of data), and a multiple bit-level control bus. For instance, interconnect 321 between switch units 311 and 312 includes a vector bus interconnect with vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload and carry scalar operands or control information. The control bus can carry control handshakes such as tokens and other signals. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g. the row and column in the array), and an interface identifier that identifies the interface on the destination switch (e.g. North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:

A bit to indicate if the chunk is scratchpad memory or configuration store data.
Bits that form a chunk number.
Bits that indicate a column identifier.
Bits that indicate a row identifier.
Bits that indicate a component identifier.

For a load operation, the configuration load controller can send N chunks to a configurable unit in order from N−1 to 0. For this example, the 6 chunks are sent out in most significant bit first order of Chunk 5->Chunk 4->Chunk 3->Chunk 2->Chunk 1->Chunk 0. (Note that this most significant bit first order results in Chunk 5 being distributed in round 0 of the distribution sequence from the array configuration load controller.) For an unload operation, the configuration unload controller can write out the unload data of order to the memory. For both load and unload operations, the shifting in the configuration serial chains in a configuration data store in a configurable unit is from LSB (least-significant-bit) to MSB (most-significant-bit), or MSB out first.

FIG. 3B illustrates an example switch unit connecting elements in an ALN. As shown in the example of FIG. 3B, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the ALN.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the ALN. For instance, a chunk of configuration data in a unit file particular to a configurable unit PMU 341 can be sent from the configuration load/unload controller 301 to the PMU 341, via a link 320 between the configuration load/unload controller 301 and the West (W) vector interface of the switch unit 311, the switch unit 311, and a link 331 between the Southeast (SE) vector interface of the switch unit 311 and the PMU 341.

In this example, one of the AGCUs is configured to be a master AGCU, which includes a configuration load/unload controller (e.g. 301). The master AGCU implements a register through which the host (120, FIG. 1) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy chained command bus (492 in FIG. 4). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top-level network. The data read from memory are transmitted by the master AGCU over the vector interface on the ALN to the corresponding configurable unit according to a distribution sequence described herein.

In one embodiment, in a way that can reduce the wiring requirements within a configurable unit, configuration and status registers holding unit files to be loaded in a configuration load process or unloaded in a configuration unload process in a component are connected in a serial chain and can be loaded through a process of shifting bits through the serial chain. In some embodiments, there may be more than one serial chain arranged in parallel or in series. When a configurable unit receives, for example, 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (150, FIG. 1). Each of the memory interfaces can be accessed using several AGCUs. Each AGCU contains a reconfigurable scalar datapath to generate requests for the off-chip memory. Each AGCU contains FIFOs (first-in-first-out buffers for organizing data) to buffer outgoing commands, data, and incoming responses from the off-chip memory.

The address generators AGs in the AGCUs can generate memory commands that are either dense or sparse. Dense requests can be used to bulk transfer contiguous off-chip memory regions and can be used to read or write chunks of data from/to configurable units in the array of configurable units. Dense requests can be converted to multiple off-chip memory burst requests by the coalescing unit (CU) in the AGCUs. Sparse requests can enqueue a stream of addresses into the coalescing unit. The coalescing unit uses a coalescing cache to maintain metadata on issued off-chip memory requests and combines sparse addresses that belong to the same off-chip memory request to minimize the number of issued off-chip memory requests.

Figure 4:
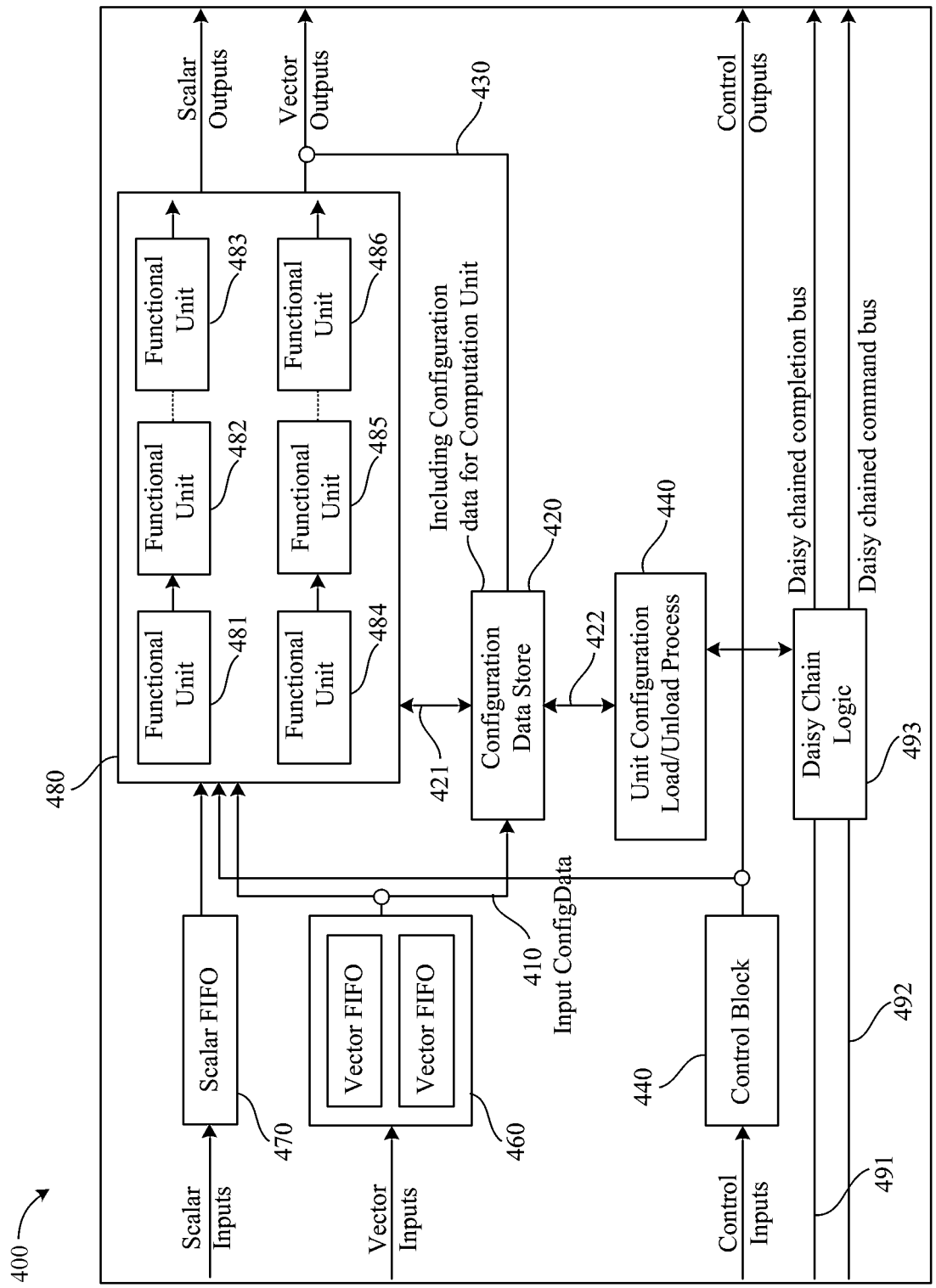
FIG. 4 is a block diagram illustrating an example configurable compute unit.

FIG. 4 is a block diagram illustrating an example configurable unit 400, such as a Pattern Compute Unit (PCU). A configurable unit can interface with the scalar, vector, and control buses, in this example using three corresponding sets of inputs and outputs: scalar inputs/outputs, vector inputs/outputs, and control inputs/outputs. Scalar IOs can be used to communicate single words of data (e.g. 32 bits). Vector IOs can be used to communicate chunks of data (e.g. 128 bits), in cases such as receiving configuration data in a unit configuration load process and transmitting and receiving data during operation after configuration across a long pipeline between multiple PCUs. Control IOs can be used to communicate signals on control lines such as the start or end of execution of a configurable unit. Control inputs are received by control block 470, and control outputs are provided by the control block 470.

Each vector input is buffered in this example using a vector FIFO in a vector FIFO block 460 which can include one or more vector FIFOs. Likewise in this example, each scalar input is buffered using a scalar FIFO 450. Using input FIFOs decouples timing between data producers and consumers and simplifies inter-configurable-unit control logic by making it robust to input delay mismatches.

A configurable unit includes multiple reconfigurable datapaths in block 480. A datapath in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each datapath in the configurable unit. The configuration serial chain in the configuration data store 420 is connected to the multiple datapaths in block 480 via line 421.

A configurable datapath organized as a multi-stage pipeline can include multiple functional units (e.g. 481, 482, 483; 484, 485, 486) at respective stages. A special functional unit SFU (e.g. 483, 486) in a configurable datapath can include a configurable module 487 that comprises sigmoid circuits and other specialized computational circuits, the combinations of which can be optimized for particular implementations. In one embodiment, a special functional unit can be at the last stage of a multi-stage pipeline and can be configured to receive an input line X from a functional unit (e.g. 482, 486) at a previous stage in a multi-stage pipeline. In some embodiments, a configurable unit like a PCU can include many sigmoid circuits, or many special functional units which are configured for use in a particular graph using configuration data.

Configurable units in the array of configurable units include configuration data stores 420 (e.g. serial chains) to store unit files comprising a plurality of chunks (or sub-files of other sizes) of configuration data particular to the corresponding configurable units. Configurable units in the array of configurable units each include unit configuration load logic 440 connected to the configuration data store 420 via line 422, to execute a unit configuration load process. The unit configuration load process includes receiving, via the bus system (e.g. the vector inputs), chunks of a unit file particular to the configurable unit and loading the received chunks into the configuration data store 420 of the configurable unit. The unit file loaded into the configuration data store 420 can include configuration data, including opcodes and routing configuration, for circuits implementing a matrix multiply as described with reference to FIGS. 6-12.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 410 can be provided to a vector FIFO as vector inputs, and then be transferred to the configuration data store 420. Output configuration data 430 can be unloaded from the configuration data store 420 using the vector outputs.

The CGRA uses a daisy-chained completion bus to indicate when a load/unload command has been completed. The master AGCU transmits the program load and unload commands to configurable units in the array of configurable units over a daisy-chained command bus. As shown in the example of FIG. 4, a daisy-chained completion bus 491 and a daisy-chained command bus 492 are connected to daisy-chain logic 493, which communicates with the unit configuration load logic 440. The daisy-chain logic 493 can include load complete status logic, as described below. The daisy-chained completion bus is further described below. Other topologies for the command and completion buses are clearly possible but not described here.

Figure 5:
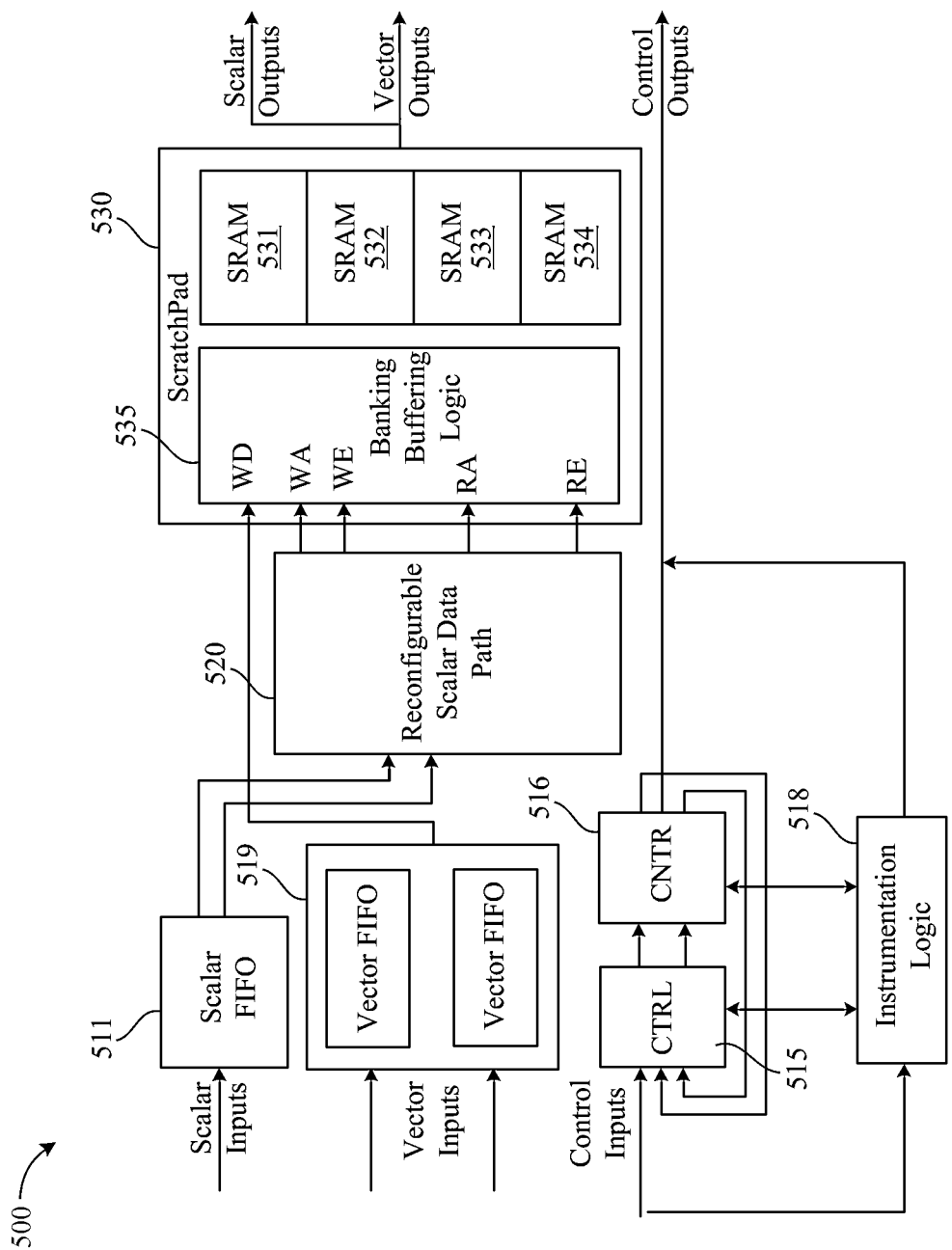
FIG. 5 is a block diagram illustrating an example configurable memory unit.

FIG. 5 is a block diagram illustrating an example configurable pattern memory unit (PMU) including an instrumentation logic unit. A PMU can contain scratchpad memory 530 coupled with a reconfigurable scalar data path 520 intended for address calculation (RA, WA) and control (WE, RE) of the scratchpad memory 530, along with the bus interfaces used in the PCU (FIG. 18). PMUs can be used to distribute on-chip memory throughout the array of reconfigurable units. In one embodiment, address calculation within the memory in the PMUs is performed on the PMU datapath, while the core computation is performed within the PCU.

The bus interfaces can include scalar inputs, vector inputs, scalar outputs and vector outputs, usable to provide write data (WD). The data path can be organized as a multi-stage reconfigurable pipeline, including stages of functional units (FUs) and associated pipeline registers (PRs) that register inputs and outputs of the functional units. PMUs can be used to store distributed on-chip memory throughout the array of reconfigurable units.

A scratchpad is built with multiple SRAM banks (e.g., 531, 532, 533, 534). Banking and buffering logic 535 for the SRAM banks in the scratchpad can be configured to operate in several banking modes to support various access patterns. A computation unit as described herein can include a lookup table stored in the scratchpad memory 530, from a configuration file or from other sources. In a computation unit as described herein, the scalar data path 520 can translate a section of a raw input value I for addressing lookup tables implementing a function f(I), into the addressing format utilized by the SRAM scratchpad memory 530, adding appropriate offsets and so on, to read the entries of the lookup table stored in the scratchpad memory 530 using the sections of the input value I. Each PMU can include write address calculation logic and read address calculation logic that provide write address WA, write enable WE, read address RA and read enable RE to the banking buffering logic 535. Based on the state of the local FIFOs 511 and 519 and external control inputs, the control block 515 can be configured to trigger the write address computation, read address computation, or both, by enabling the appropriate counters 516. A programmable counter chain 516 (Control Inputs, Control Outputs) and control block 515 can trigger PMU execution.

Instrumentation logic 518 is included in this example of a configurable unit. The instrumentation logic 518 can be part of the control block 515 or implemented as a separate block on the device. The instrumentation logic 518 is coupled to the control inputs and to the control outputs. Also, the instrumentation logic 518 is coupled to the control block 515 and the counter chain 516, for exchanging status signals and control signals in support of a control barrier network configured as discussed above.

This is one simplified example of a configuration of a configurable processor for implementing a computation unit as described herein. The configurable processor can be configured in other ways to implement a computation unit. Other types of configurable processors can implement the computation unit in other ways. Also, the computation unit can be implemented using dedicated logic in some examples, or a combination of dedicated logic and instruction-controlled processors.

Figure 6:
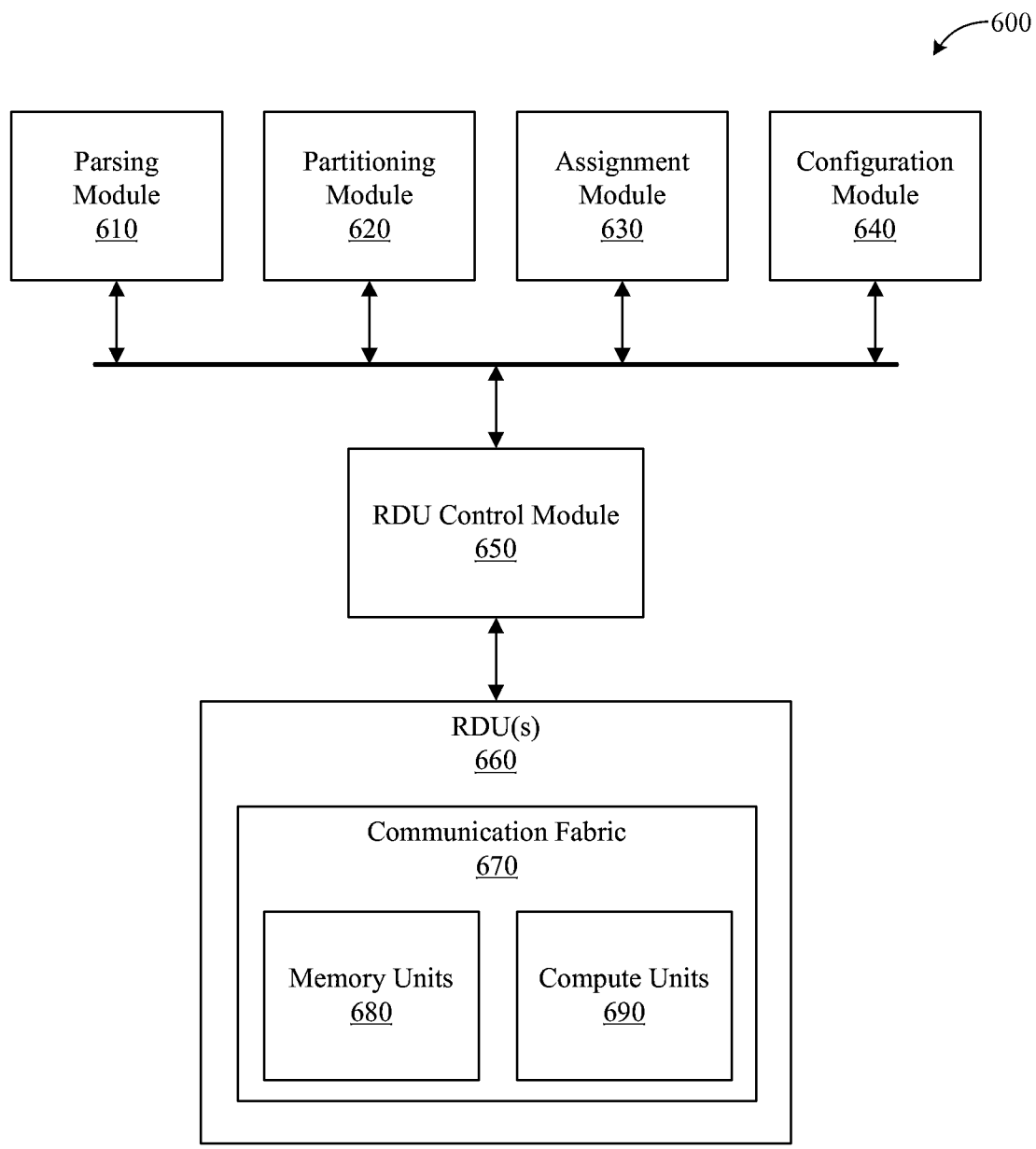
FIG. 6 is a block diagram depicting one example a data processing system.

FIG. 6 is a block diagram depicting one example a data processing system 600. As depicted, the data processing system 600 includes a parsing module 610, a partitioning module 620, an assignment module 630, a configuration module 640, an RDU control module 650, and one or more RDUs 660 comprising a communication fabric 670, memory units 680 and compute units 690. The data processing system 600 works in conjunction with the compiler stack 100B, or the like, and enables the partitioning of source code into selected executable partitions and execution of the selected executable partitions on the RDUs 660.

Figure 10:
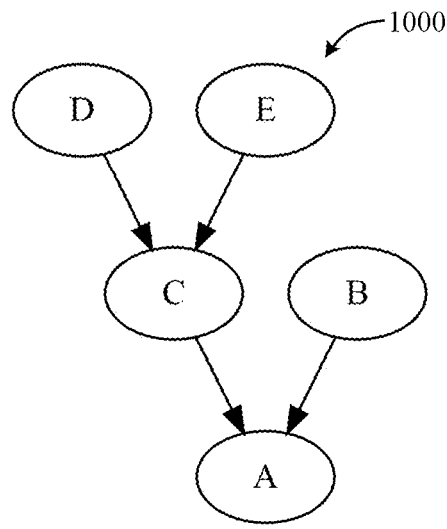
FIG. 10 depicts a simplified example of a compute graph suitable for demonstrating the method of FIG. 8.

The parsing module 610, parses source code provided by a user or upper levels of a compiler stack. In some embodiments, the parser generates a compute graph where the nodes of the compute graph correspond to expressions including tensor indexing expressions. The compute graph may indicate dependencies between expressions and/or operations. A simple example of a compute graph is illustrated in FIG. 10.

The partitioning module 620 partitions the compute graph into selected executable partitions which are assigned to the RDUs 660 and optionally resources within the RDUs 660 by the assignment module 630. The configuration module 640 determines (generates) the configuration information necessary to execute (that enables execution of) the selected executable partitions on the RDUs 660 and provides the configuration information to the RDU control module 650. The RDU control module 650 may correspond to the runtime layer 60 shown in FIG. 1B.

The RDU control module 650 may provide the configuration information to the RDU(s) and initiate data flow in the computing grid. The communication fabric 670 enables communication between the RDU control module 650, memory units 680 and compute units 690 within the RDU(s) 660.

Figure 7:
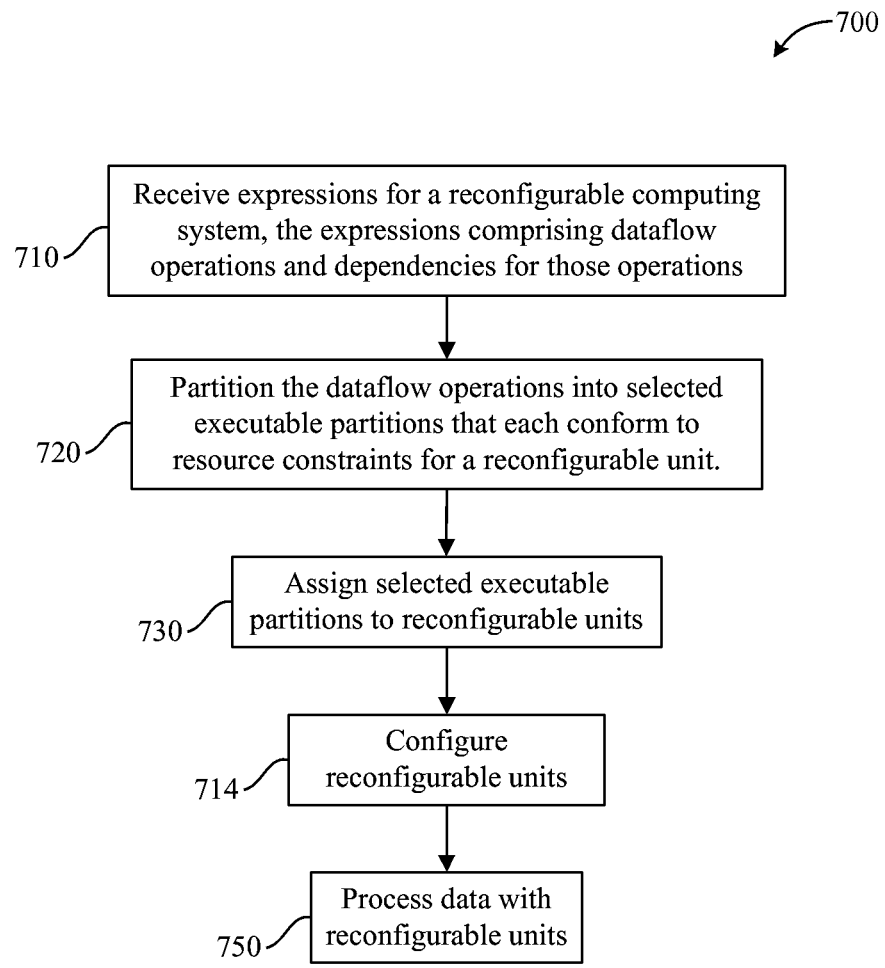
FIG. 7 is a flowchart depicting one example a data processing method.

FIG. 7 is a flowchart depicting one example of a data processing method 700. As depicted, the data processing method 700 includes receiving (710) dataflow operations for a reconfigurable computing system, partitioning (720) the dataflow operations into selected executable partitions, assigning (730) selected executable partitions to reconfigurable units, configuring (740) the reconfigurable units and processing (750) data with the reconfigurable units. The data processing method 700 may be conducted by the data processing system 600 and enables the processing of data with RDUs in a reconfigurable computing system.

Receiving (710) dataflow operations for a reconfigurable computing system may include receiving expressions for a reconfigurable computing system that define the dataflow operations and dependencies for those operations. In one embodiment, the expressions are RAIL expressions.

Partitioning (720) the dataflow operations into selected executable partitions may include generating an extensive list of candidate partitions and selecting from the candidate partitions the selected executable partitions. Each selected executable partition may conform to resource constraints for one or more reconfigurable units such as compute units, memory units and address generation units. In one embodiment, the partitioning step 720 is performed by the RAIL layer 40 in conjunction with the Assembler layer 44 of the compiler stack 100B. In conjunction with the partition step 720, a memory partitioning operation may be conducted that partitions a logical tensor into multiple physical memory units.

Assigning (730) selected executable partitions to reconfigurable units may include determining which compute units, memory units, address generation units and other resources are available for assignment and assigning available units to the selected executable partitions. In one embodiment, the assigning step 730 is performed by the RAIL layer 40 including the Assembler 44, and Prism layer 50 of the compiler stack 100B. In conjunction with the assigning operation 730, a place and route operation may be conducted to assign a physical dataflow graph onto the reconfigurable units and associated interconnection elements.

Configuring (740) the reconfigurable units may include configuring the assigned compute units, memory units and address generation units for execution of the operations within the selected executable partition to which the reconfigurable units are assigned. In one embodiment, the configuring step 740 is performed by the runtime layer 60.

Processing (750) data with the reconfigurable units may include executing the operations within the selected executable partition to which the reconfigurable units are assigned. In one embodiment, the processing step 750 is performed by the RDUs 660 under direction of the runtime layer 60 and/or the RDU control module 650.

Figure 8:
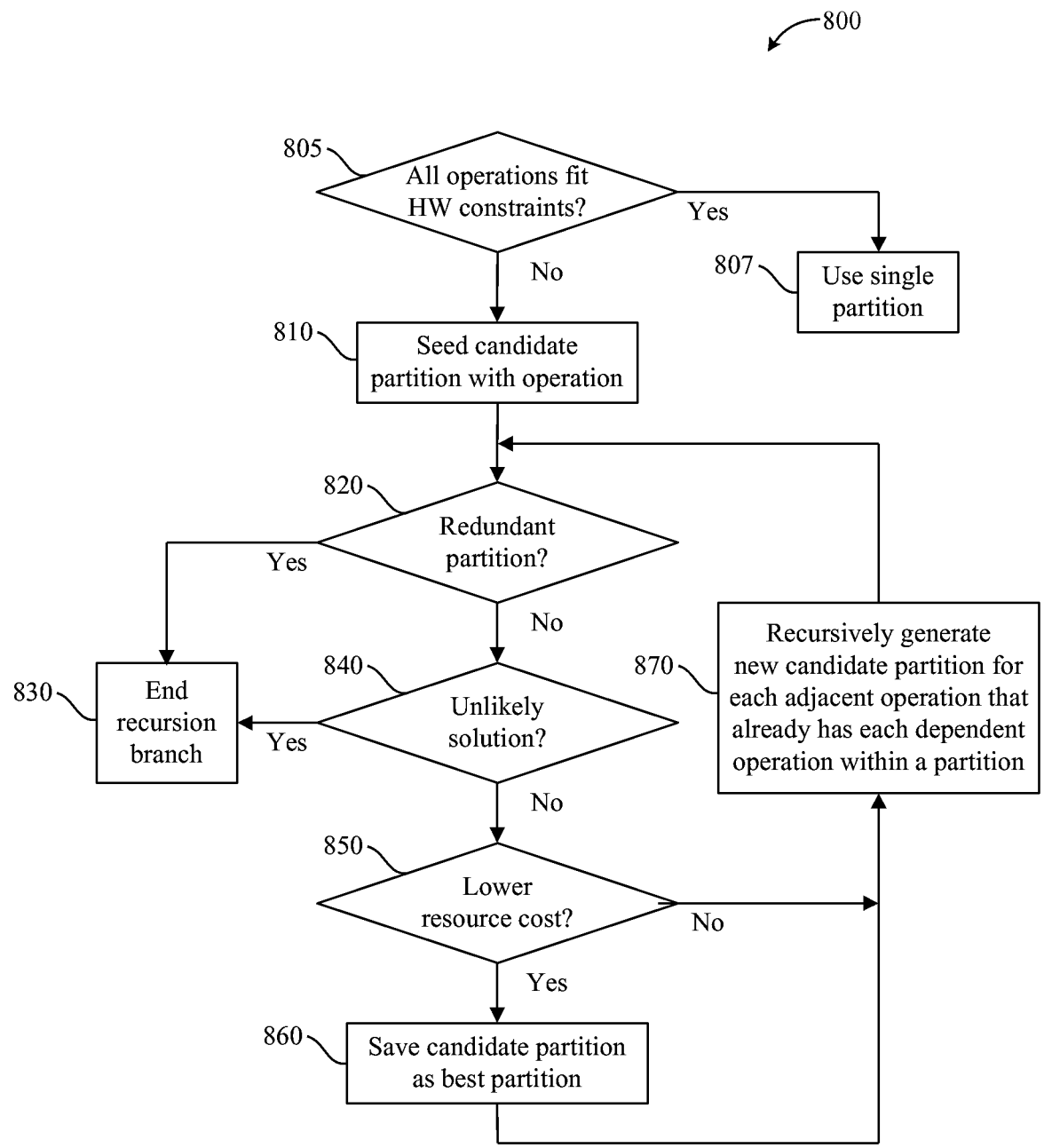
FIG. 8 is a flowchart depicting one example of a method for partitioning dataflow operations for a reconfigurable computing system.

FIG. 8 is a flowchart depicting one example of a partitioning method 800. As depicted, the partitioning method 800 includes determining (805) whether all operations fit, using (807) a single partition, seeding (810) a candidate partition, determining (820) whether the candidate partition is redundant, ending (830) a recursion branch, determining (840) whether the candidate partition is an unlikely solution, determining (850) whether the candidate partition has better resource cost, saving (860) the candidate partition and recursively generating (870) new candidate partitions. The partitioning method 800 enables the partitioning of dataflow operations for a reconfigurable computing system.

Determining (805) whether all operations fit may include determining whether all operations within a compute graph fit the available hardware constraints. In one embodiment, a resource cost function is invoked for the compute graph and the required resource cost is compared to the available hardware resources. If all operations fit, the method continues by using (807) a single partition and terminating the partitioning method 800. If the operations do not fit the method continues by seeding (810) a candidate partition. Seeding (810) a candidate partition may include initializing a new partition as the candidate partition and inserting the root node/operation of a compute graph, or another node/operation with no dependent nodes/operations that are not already in existing partitions, into the candidate partition.

Determining (820) whether the candidate partition is redundant may include comparing the candidate partition with a list of visited partitions. In one embodiment, the comparison is conducted by determining if there is a one-to-one correspondence between the nodes/operations in the candidate partition and each visited partition. If a one-to-one correspondence is not found, the candidate partition is not redundant and the method advances by determining (840) whether the candidate partition is an unlikely solution. If a one-to-one correspondence is found, the candidate partition is redundant and the method advances by ending (830) the current recursion branch.

Ending (830) the current recursion branch may include terminating the current branch and returning to an invoking branch of the method 800. The invoking branch may correspond to a candidate partition with fewer nodes/operations.

Determining (840) whether the candidate partition is an unlikely solution may include applying a heuristic. In one embodiment, the heuristic includes determining if the size of the current partition is already larger or equal to the number of maximum operations supported by a physical unit. The heuristic may also include considering a set of resource costs such as the number of input and output ports, number of stages, and the number of live variables, etc. It should be noted that some of the costs, such as the number of stages, increase monotonically as more operations are included in the partition. Hence, recursion may be terminated on a candidate when these monotonically increasing costs exceed a physical limit. One of skill in the art will appreciate that additional heuristics maybe applied to further prune the search space.

If the candidate is an unlikely solution, the method advances by ending (830) the current recursion branch. If the candidate is not an unlikely solution, the method advances by determining (850) whether the candidate partition has a lower resource cost. One of skill in the art will appreciated that the determining step 840 is an optional step that helps prune the number of possible solutions that are tested and that the applied heuristic can be dynamically tuned to ensure that a near optimal solution is found without causing the method 800 to thrash on possible solutions.

Determining (850) whether the candidate partition has a lower resource cost may include conducting a weighted cost comparison of the resources required by the candidate partition with the current best weighted resource cost. In one embodiment, the cost of the candidate partition is determined by conducting a trial compilation process for the lower levels of the compiler stack. For example, the expressions belonging to the candidate partition may be compiled to physical resources to determine the expected resource cost. If the candidate partition does not have a lower resource cost the method advances to step 870. If the candidate partition does have a lower resource cost the method advances by saving (860) the candidate partition.

Saving (860) the candidate partition may include saving the list of nodes/operations in the candidate partition and the resource costs associated with that partition. Recursively generating (870) new candidate partitions may include determining which adjacent operations in the compute graph already have each dependent operation within a partition and then recursively forming a new candidate partition for each qualifying adjacent operation.

FIGS. 9A and 9B show one example of pseudo-code 900 for implementing the method of FIG. 8. The depicted pseudo-code 900 comprises a number of functions/procedures including a 'partition_graph' function, a 'root_nodes' function, an 'add_to_worklist' function, an 'expand_partition' function and an 'update_best' function. The pseudo-code 900 depicts one example of an implementation of the partitioning method 800.

The 'partition_graph' function receives a graph comprising a set of nodes/operations that are to be partitioned into one or more executable graphs that can be mapped to, and executed by, one or more configurable units such as compute units, memory units, address generation units and RDUs. The partitioning may be hierarchical and start with coarser configurable units such as RDUs and be broken down to finer reconfigurable units such as PMUs and PCUs. The partition_graph' function may also receive one or more threshold parameters that indicate the maximum allowable cost or instance count of various resources.

The 'root_nodes' function determines the set of nodes within a graph that do not have any dependents. The 'root_nodes' function may be invoked in conjunction with operation 870 of the partitioning method 800.

The 'add_to_worklist' function places the graph received by the 'partition_graph' function into a working set/list of nodes/operations. The 'partition_graph' function attempts to place the working set/list of nodes/operations into partitions until the set/list is empty.

The 'expand_partition' function is one example of operation 870 of the partitioning method 800. The 'expand_partition' recursively forms a new candidate partition for each qualifying adjacent node/operation in the compute graph. Qualifying adjacent nodes/operations are nodes/operations adjacent to the nodes/operations of the candidate partition that already have each dependent operation within the candidate partition or a previously selected partition.

The 'update_best' function updates the best candidate partition and the resource cost of that partition. The 'update_best' function may be invoked in conjunction with operation 860 of the partitioning method 800.

FIG. 10 depicts a simplified example of a compute graph 1000 suitable for demonstrating the partitioning method 800. Nodes in the compute graph 1000 represent the operations in an expression and edges indicate the dataflow dependencies across operations. The compute graph 1000 indicates dependencies and dataflow with unidirectional edges. For simplicity, the nodes of the compute graph 1000 are labeled with operation labels 'A' through 'E'.

Figure 11:
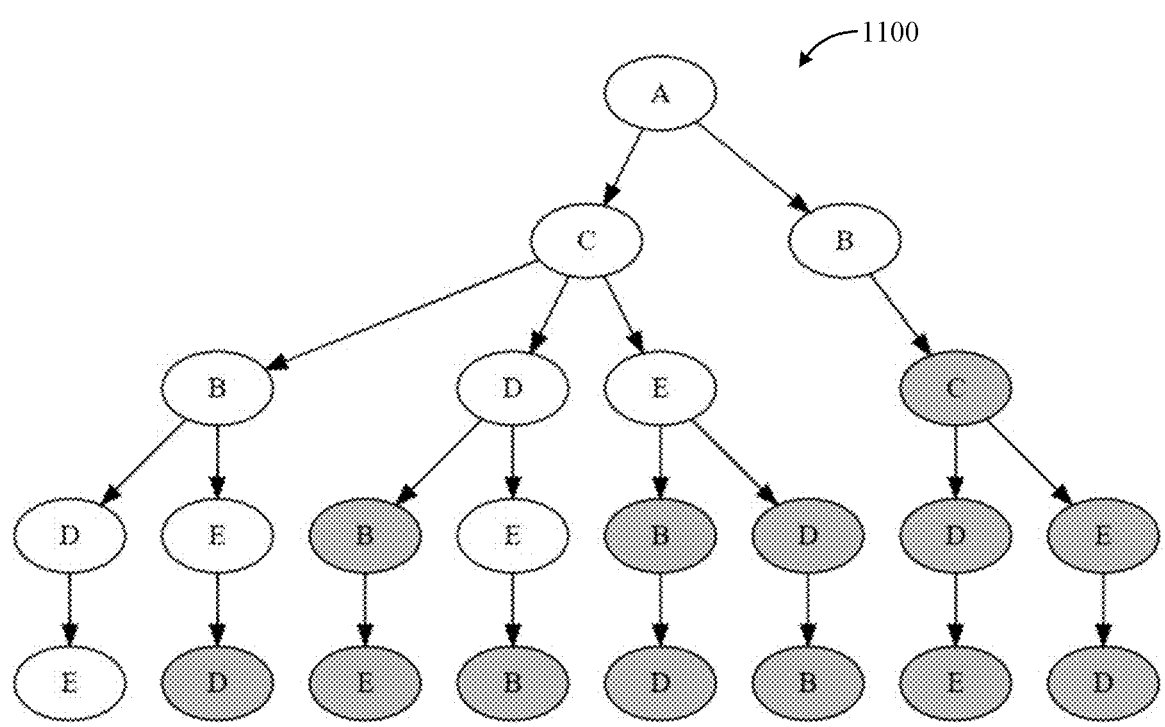
FIG. 11 depicts a recursion tree corresponding to the compute graph of FIG. 10.

FIG. 11 depicts a recursion tree 1100 that could be generated in conjunction with the partitioning method 800 partitioning the compute graph 1000. The recursion tree 1100 represents each potentially valid partitioning of the compute graph 1000. Potentially valid partitioning's are permutations of adjacent nodes/operations whose dependent nodes/operations are already within the candidate partition or a previously selected partition. The operations that are within a potentially valid partitioning are determined by aggregating each of the ancestor nodes/operations along with the selected operation/node in the recursion tree 1100. For example, the leftmost grandchild of the root of the recursion tree 1100 represents a partitioning that includes nodes B, C and A.

One of skill in the art will appreciate that the shaded nodes of the recursion tree 1100 correspond to partition permutations that are combinatorically redundant. Consequently, those nodes (and their children) can be omitted when generating potentially valid partitions.

Figure 12:
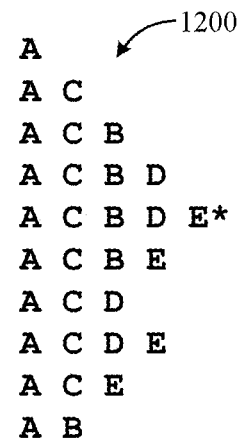
FIG. 12 depicts one example of candidate partitions corresponding to the compute graph of FIG. 10.

FIG. 12 depicts one example of candidate partitions 1200 corresponding to the compute graph 1000 of FIG. 10. Each line indicates a possible combination of nodes to be included in a candidate partition. The candidate partitions 1200 could be generated from the recursion tree 1100 or a similar data structure or method for generating potentially valid partitions. In the depicted example, the first generated candidate partition would be the root node/operation of the recursion tree namely node/operation A. Subsequently, node/operation C could be added to the candidate partition to form candidate partition AC since it is the leftmost child of node A in the recursion tree. By continuing with a left-first and depth-first traversal of the recursion tree valid candidate partitions that include nodes/operations A and C can be generated/considered. Subsequently, after traversal of the children of candidate partition AC, valid permutations of partitions that include nodes/operations A and B can be generated/considered.

One of skill in the art will appreciate that the shaded nodes of the recursion tree 1100 correspond to partition permutations that are combinatorically redundant. Consequently, those nodes (and their children) need not be visited when generating the candidate partitions 1200. For example, the parent of the third leaf node from the left (i.e., partition permutation/option ACDB) is redundant with the previously visited permutation/option ACBD (corresponding to the parent of the leftmost leaf node of the recursion tree 1100). Consequently, that node and the children of that node need not be visited when generating the candidate partitions 1200.

One of skill in the art will appreciate that traversal of the recursion tree 1100 need not occur in a left-first and depth-first order and that any systematic traversal method known to those of skill in the art could be used to generate the potentially valid partitions. Furthermore, one of skill in the art will also appreciate that it is not necessary to construct an actual recursion tree 1100. For example, the partitioning method 800 and the pseudo-code 900 presented in FIGS. 9A and 9B need not construct an actual recursion tree 1100 to generate the candidate partitions 1200 via recursion on the qualifying frontier nodes.

Figure 13A:
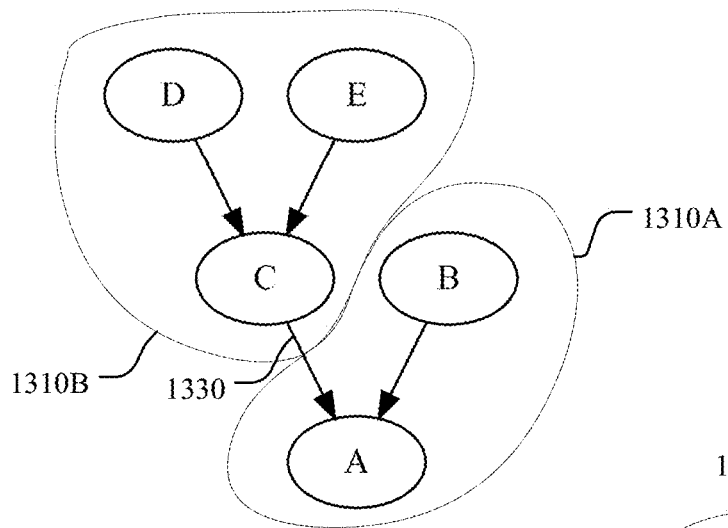
FIGS. 13A and 13B show two examples of partition sets resulting from partitioning the compute graph of FIG. 10.
Figure 13B:
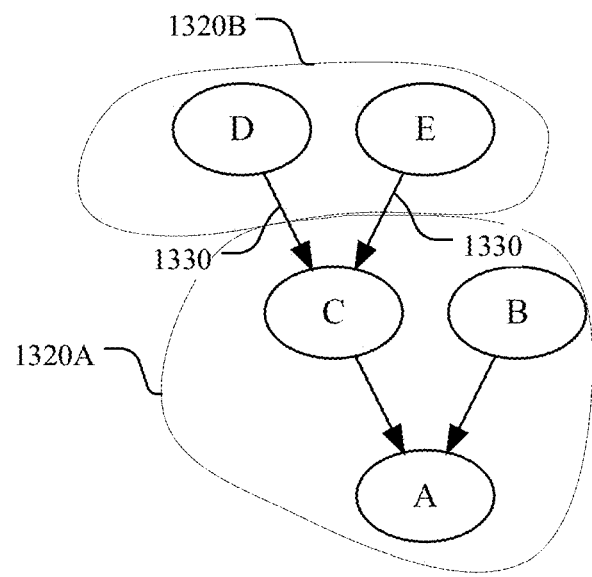

FIGS. 13A and 13B show two examples of partition sets resulting from partitioning the compute graph of FIG. 10. FIG. 13A shows a first partition set 1310 where nodes/operations A and B are included into partition 1310A and whose nodes/operations C, D and E are included in partition 1310B. FIG. 13B shows a second partition set 1320 where nodes/operations A, B and C are included into partition 1320A and nodes/operations D and E are included in partition 1320B. One of skill in the art will recognize that partition set 1310 has a single dependency 1330 between partitions 1310A and 1310B while partition set 1320 has two dependencies 1330 between partitions 1320A and 1320B. Consequently, partition set 1310 would be preferred over partition set 1320 in the absence of other considerations such as the number of compute units and memory units required by the operations within each partition.

Figure 14:
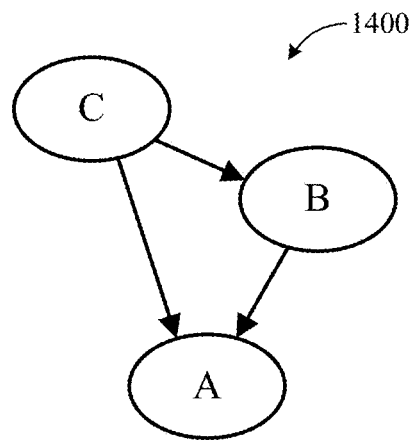
FIG. 14 depicts another simplified example of a compute graph suitable for demonstrating certain aspects of the method of FIG. 8.

FIG. 14 depicts another simplified example of an compute graph 1400 suitable for demonstrating certain aspects of the method of FIG. 8. The compute graph 1400 includes nodes A, B and C representing specific dataflow operations. The compute graph 1400 exemplifies the need for assessing whether the dependents of an adjacent node are already within the candidate partition or a previously selected partition.

One of skill in the art will appreciate that node/operation A has no dependent nodes/operations and could therefore be used to seed the candidate partition. One of skill in the art will also appreciate that nodes/operations B and C are adjacent to node/operation A and could be candidates for inclusion into the frontier of the candidate partition. However, node/operation C provides results to dependent node/operation B. Consequently, the method of FIG. 8 would not include node/operation C into the frontier of the candidate partition until node/operation B is already incorporated into the candidate partition. One of skill in the art will appreciate that this approach avoids creating potential deadlocks where two partitions are dependent on each other and could not be sequentially executed.

The embodiments disclosed herein include a system for partitioning executable operations for a reconfigurable computing system, the system comprising:
 a parsing module configured to receive a set of expressions for a reconfigurable computing system comprising a plurality of reconfigurable units and parse the set of expressions into a plurality of operations and dependencies for those operations
 a partitioning module configured to partition the plurality of operations into selected executable partitions wherein each selected executable partition conforms to resource constraints for a reconfigurable unit of the plurality of reconfigurable units
 wherein partitioning the plurality of operations into selected executable partitions comprises:
  seeding a candidate partition with an operation
  recursively generating an additional candidate partition for each operation adjacent to the candidate partition whose dependent operations are already within the candidate partition or a previously selected partition
  selecting a best candidate partition based on resource cost
 Optional features for the above system include:
 wherein partitioning module is configured to continue partitioning until each of the plurality of operations is assigned to a selected executable partition
 wherein partitioning module is configured to generate a tree of possible partitions
  wherein generating the tree of possible partitions comprises adding a node to the tree of possible partitions for each operation adjacent to a candidate partition
 wherein partitioning module is configured to determine if the candidate partition is redundant
 wherein partitioning module is configured to determine if the candidate partition is unlikely to produce a solution
 wherein the partitioning module is configured to determine if the candidate partition has a lower resource cost than previous candidate partitions
 wherein the partitioning module is configured to determine if the best candidate partition fits within a configurable unit
 wherein the plurality of reconfigurable units comprise a plurality of compute units, a plurality of memory units and a plurality of address generation units
 an assignment module configured to allocate one or more corresponding reconfigurable units for each selected executable partition
 a configuration module for configuring each corresponding reconfigurable unit using the corresponding selected executable partition The embodiments disclosed herein include a method for partitioning executable operations for a reconfigurable computing system, the method comprising:
 receiving a set of expressions for a reconfigurable computing system comprising a plurality of reconfigurable units, wherein the expressions comprise a plurality of
operations and dependencies for those operations
partitioning the plurality of operations into selected
executable partitions wherein each selected executable
partition conforms to resource constraints for a reconfigurable unit of the plurality of reconfigurable units
wherein partitioning the plurality of operations into
selected executable partitions comprises:
seeding a candidate partition with an operation
recursively generating an additional candidate partition
for each operation adjacent to the candidate partition
whose dependent operations are already within the
candidate partition or a previously selected partition
selecting a best candidate partition based on resource
cost
Optional features for the above method include:
wherein partitioning is continued until each of the plurality of operations is assigned to a selected executable
partition
wherein partitioning the plurality of operations into
selected executable partitions comprises generating a
tree of possible partitions
wherein generating the tree of possible partitions comprises adding a node to the tree of possible partitions for
each operation adjacent to a candidate partition
determining if the candidate partition is redundant
terminating recursion on the candidate partition in
response to determining the candidate partition is
redundant
determining if the candidate partition is unlikely to produce a solution
terminating recursion on the candidate partition in
response to determining the candidate partition is
unlikely to produce a solution
determining if the candidate partition has a lower resource
cost than previous candidate partitions
saving the currently constructed partition as a best
partition for the reconfigurable unit responsive to
determining that the currently constructed partition
has a lower resource cost than previous candidate
partitions
determining if the best candidate partition fits within a
configurable unit
adding the candidate partition to a set of visited partitions
allocating one or more corresponding reconfigurable units
for each selected executable partition
configuring each corresponding reconfigurable unit
using the corresponding selected executable partition
to produce a plurality of configured units
processing data using the plurality of configured
units
wherein configuring each corresponding reconfigurable unit comprises providing configuration
instructions.
wherein the plurality of reconfigurable units comprise a plurality of compute units
wherein the configuration instructions comprise
compute-related configuration instructions
wherein the plurality of reconfigurable units comprise a plurality of memory units [i.e., pattern
memory units]
wherein the configuration instructions comprise
memory-related configuration instructions
wherein the plurality of reconfigurable units comprise a plurality of address generation units
wherein the configuration instructions comprise
configuration instructions for address generation
wherein the configuration instructions are generated by compiling a user program
wherein the configuration instructions are generated by a user
wherein the configuration instructions conform to
a domain-specific language for configuring
reconfigurable units Referring again to (at least) FIG. 4 and as will be appreciated by those of ordinary skill in the art, aspects of the various embodiments described herein may be embodied as a system, device, method, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "apparatus," "circuit," "circuitry," "module," "computer," "logic," "FPGA," "unit," "system," or other terms. Furthermore, aspects of the various embodiments may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object-oriented programming languages such as Java, Python, C++, or the like, conventional procedural programming languages, such as the "C" programming language or similar programming languages, or low-level computer languages, such as assembly language or microcode. In addition, the computer program code may be written in VHDL, Verilog, or another hardware description language to generate configuration instructions for an FPGA, CGRA IC, or other programmable logic. The computer program code if converted into an executable form and loaded onto a computer, FPGA, CGRA IC, or other programmable apparatus, produces a computer implemented method. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

We claim as follows:

1. A system for partitioning executable operations for a reconfigurable computing system, the system comprising:
   a parsing module configured to receive a set of expressions for a reconfigurable computing system comprising a plurality of reconfigurable units and parse the set of expressions into a plurality of operations and dependencies for those operations;
   a partitioning module configured to partition the plurality of operations into selected executable partitions wherein each selected executable partition conforms to resource constraints for a reconfigurable unit of the plurality of reconfigurable units;
   wherein partitioning the plurality of operations into selected executable partitions comprises:
      seeding a candidate partition with an operation,
      recursively generating an additional candidate partition for each operation adjacent to the candidate partition whose dependent operations are already within the candidate partition or a previously selected partition, and
      selecting a best candidate partition based on resource cost.

2. The system of claim 1, wherein partitioning module is configured to continue partitioning until each of the plurality of operations is assigned to a selected executable partition.

3. The system of claim 1, wherein partitioning module is configured to generate a tree of possible partitions.

4. The system of claim 1, wherein the partitioning module is configured to determine if the candidate partition is redundant.

5. The system of claim 1, wherein the partitioning module is configured to determine if the candidate partition is unlikely to produce a solution.

6. The system of claim 1, wherein the partitioning module is configured to determine if the candidate partition has a lower resource cost than previous candidate partitions.

7. The system of claim 1, wherein the partitioning module is configured to determine if the best candidate partition fits within a configurable unit.

8. The system of claim 1, wherein the plurality of reconfigurable units comprise a plurality of compute units, a plurality of memory units and a plurality of address generation units.

9. The system of claim 1, further comprising an assignment module configured to allocate one or more corresponding reconfigurable units for each selected executable partition.

10. The system of claim 1, further comprising a configuration module for configuring a set of reconfigurable units of the plurality of reconfigurable units using the selected executable partitions.

11. The system of claim 3, wherein generating the tree of possible partitions comprises adding a node to the tree of possible partitions for each operation adjacent to a candidate partition.

12. A method for partitioning executable operations for a reconfigurable computing system, the method comprising:
   receiving expressions for a reconfigurable computing system comprising a plurality of reconfigurable units, wherein the expressions comprise a plurality of operations and dependencies for those operations;
   partitioning the plurality of operations into selected executable partitions wherein each selected executable partition conforms to resource constraints for a reconfigurable unit of the plurality of reconfigurable units; and
   wherein partitioning the plurality of operations into selected executable partitions comprises:
      seeding a candidate partition with an operation,
      recursively generating an additional candidate partition for each operation adjacent to the candidate partition whose dependent operations are already within the candidate partition or a previously selected partition, and
      selecting a best candidate partition based on resource cost.

13. The method of claim 12, wherein partitioning is continued until each of the plurality of operations is assigned to a selected executable partition.

14. The method of claim 12, wherein partitioning the plurality of operations into selected executable partitions comprises generating a tree of possible partitions.

15. The method of claim 12, further comprising determining if the candidate partition is redundant.

16. The method of claim 12, further comprising determining if the candidate partition is unlikely to produce a solution.

17. The method of claim 12, further comprising determining if the candidate partition has a lower resource cost than previous candidate partitions.

18. The method of claim 12, further comprising determining if the best candidate partition fits within a configurable unit.

19. The method of claim 12, further comprising adding the candidate partition to a set of visited partitions.

20. The method of claim 12, further comprising allocating one or more corresponding reconfigurable units of the plurality of reconfigurable units for each of the selected executable partitions.

21. The method of claim 14, wherein generating the tree of possible partitions comprises adding a node to the tree of possible partitions for each operation adjacent to a candidate partition.

22. The method of claim 15, further comprising terminating recursion on the candidate partition in response to determining the candidate partition is redundant.

23. The method of claim 16, further comprising terminating recursion on the candidate partition in response to determining the candidate partition is unlikely to produce a solution.

24. The method of claim 17, further comprising saving the candidate partition as the best candidate partition for a corresponding reconfigurable unit responsive to determining that the candidate partition has a lower resource cost than previous candidate partitions.

25. The method of claim 20, further comprising configuring each of the one or more corresponding reconfigurable units using a corresponding executable partition of the selected executable partitions to produce a plurality of configured units.

26. The method of claim 25, further comprising processing data using the plurality of configured units.

27. The method of claim 25, wherein configuring each corresponding reconfigurable unit comprises providing configuration instructions.

28. The method of claim 27, wherein the plurality of reconfigurable units comprise a plurality of compute units.

29. The method of claim 27, wherein the plurality of reconfigurable units comprise a plurality of memory units.

30. The method of claim 27, wherein the plurality of reconfigurable units comprise a plurality of address generation units.

31. The method of claim 27, wherein the configuration instructions are generated by compiling a user program.

32. The method of claim 27, wherein the configuration instructions are generated by a user.

33. The method of claim 27, wherein the configuration instructions conform to a domain-specific language for configuring reconfigurable units.

34. The method of claim 28, wherein the configuration instructions comprise compute-related configuration instructions.

35. The method of claim 29, wherein the configuration instructions comprise memory-related configuration instructions.

36. The method of claim 30, wherein the configuration instructions comprise configuration instructions for address generation.

* * * * *